United States Patent [19]
Fallon et al.

[11] Patent Number: 6,005,858
[45] Date of Patent: Dec. 21, 1999

[54] TELECOMMUNICATIONS SWITCHING SYSTEM

[75] Inventors: Liam Fallon; Michael Adams; James O'Meara, all of Westmeath, Ireland

[73] Assignee: Ericsson Invention Ireland Limited, Athlone, Ireland

[21] Appl. No.: 08/877,705

[22] Filed: Jun. 17, 1997

[30] Foreign Application Priority Data

Jun. 17, 1996 [IE] Ireland .................................. S960446
Jun. 17, 1996 [IE] Ireland .................................. S960447

[51] Int. Cl.⁶ .................................................. H04Q 11/00
[52] U.S. Cl. ........................... 370/351; 370/360; 370/401
[58] Field of Search .................................. 370/380, 351, 370/381, 252, 360, 410, 401, 522; 379/229, 230, 207, 219, 220

[56] References Cited

U.S. PATENT DOCUMENTS

| | | | |
|---|---|---|---|
| 4,476,559 | 10/1984 | Brolin et al. | 370/110.1 |
| 4,811,388 | 3/1989 | Westerhof et al. | 379/229 |
| 5,151,897 | 9/1992 | Suzuki | 370/85.13 |
| 5,206,902 | 4/1993 | Bowker | 379/220 |
| 5,473,681 | 12/1995 | Partridge, III | 379/229 |
| 5,577,113 | 11/1996 | Bray et al. | 379/220 |
| 5,774,668 | 6/1998 | Choquier et al. | 395/200.53 |
| 5,774,695 | 6/1998 | Autrey et al. | 395/500 |
| 5,784,449 | 7/1998 | Ardon | 379/230 |
| 5,838,782 | 11/1998 | Lindquist | 379/230 |
| 5,852,660 | 12/1998 | Lindquist et al. | 379/230 |
| 5,910,954 | 6/1999 | Bronstein et al. | 370/401 |

FOREIGN PATENT DOCUMENTS 0 493 912  12/1991  European Pat. Off. .

*Primary Examiner*—Dang Ton
*Assistant Examiner*—Eva Tang
*Attorney, Agent, or Firm*—Jacobson, Price, Holman & Stern, PLLC

[57] ABSTRACT

A telecommunications switching system (1) has a switch unit (2) having switches (9) controlled by local modules (10). These modules implement instructions which are either in-build or are received from remote modules (20) on machines (6, 7, 8) which communicate via a central router (3). This allows almost unlimited processing scalability and versatility. An application object base (21) has an object corresponding directly to a local module (10) or a subset thereof and a signal base (22) provides signal-level commands understood by the local module (10). A signal transfer function (23) on the remote machine (6), and a signal transfer function (11) on the switch unit (2) provide for direct transfer of signals in both directions. There is no need to modify the local modules (10) as the signal transfer function (11) is addressable as a local module and the remote aspect of the interaction is transparent to the local modules (10).

9 Claims, 3 Drawing Sheets

TELECOMMUNICATIONS SWITCHING SYSTEM

FIELD OF THE INVENTION

The invention relates to a telecommunications switching system, and more particularly to control of such a system.

PRIOR ART DISCUSSION

Such switching systems have been well developed in recent years and have reached the stage where quite complex control and switching tasks can be performed. Examples of such control are blocking of subscriber numbers, monitoring of fault lists, monitoring traffic volume parameters, and routine measurement of subscriber lines.

At present, such control functions are performed centrally such as described in EP493912(ATT) in which node processors are connected to either local or remote switches which form part of the switching system. This specification describes a hierarchy of call control functions for efficient switching control. This control appears to be quite effective, however, it also appears that control functionality is limited by the capacity of the node processors and upgrading can be difficult.

OBJECTS OF THE INVENTION

One object is to provide a switching system architecture which allows non-intrusive scaling of control functionality in a simple manner.

Another object is to allow more flexible control arrangements whereby control can be achieved from a number of locations.

A further object is to provide for addition of control functionality to existing switching systems with little modification of the existing software and hardware.

SUMMARY OF THE INVENTION

According to the invention, there is provided a telecommunications switching system comprising a plurality of switches connected to a processor means characterised in that, the processor means comprises a plurality of local modules connected to a local transport service, and a plurality of remote modules connected to a remote transport service;

the system further comprises a central router comprising a transport service comprising means for communication with the local and remote transport services;

the system further comprises a local signal transfer function which is addressable by the local modules as another such module, and comprises means for transferring signals from the local modules to the remote modules via the transport services; and the local modules comprise means for controlling the switches according to commands received from the remote modules and for downloading switch status data to the remote modules.

Preferably, the local signal transfer function comprises means for operating in a dedicated signal transfer mode according to pre-defined transfer parameter values without reference to data or commands in transferred signals.

In one embodiment, said parameter values include values for signal priorities and delays, and verification values.

Preferably, the central router transport service comprises means for operating as a static process, and the modules comprise means for operating as dynamic processes which dynamically link up with said static process.

In one embodiment, the system further comprises a remote signal transfer function comprising means for transferring signals between the remote modules and the remote transport service and for operating according to parameter values which are compatible with those of the local signal transfer function.

In another embodiment, the system further comprises a signal base comprising means for interfacing between the remote modules and the remote signal transfer function by providing signal-level commands for module-level instructions.

Ideally, said signal base comprises means for providing signal-level commands for different module-level instructing protocols for universal transfer through the remote signal transfer function.

In another embodiment, the system further comprises an object base comprising software objects each corresponding to a function of a local module and comprising means for generating instructions for the signal base corresponding to higher-level module instructions.

In a further embodiment, the object base comprises objects corresponding to creation of a route, blocking a route, and unblocking a route.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

Figure 1:
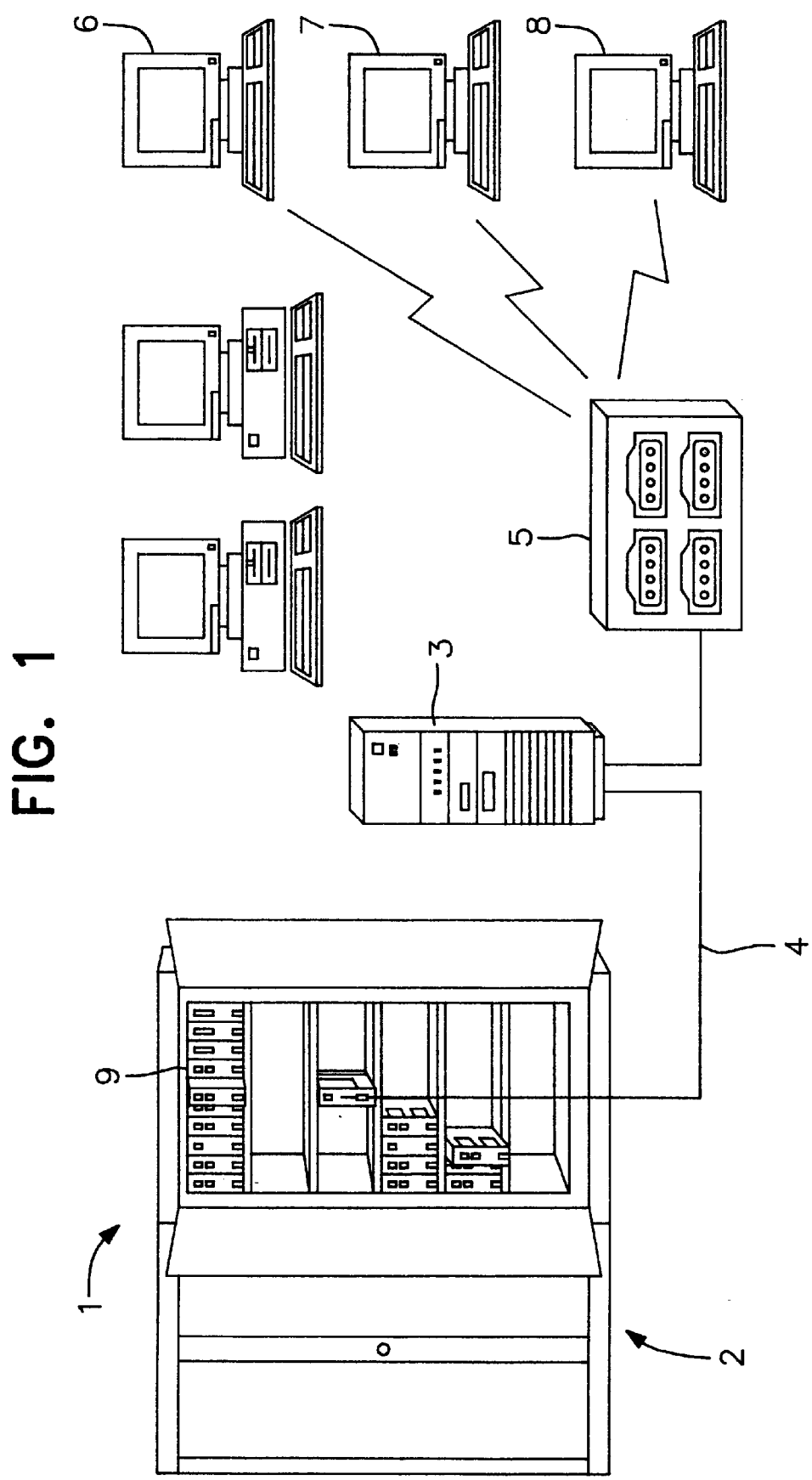
FIG. 1 is a schematic representation of a telecommunications switching system of the invention.

Referring to the drawings, and initially to FIG. 1 there is shown a telecommunications switching system 1. The system 1 comprises a switching unit 2 which is of the type marketed under the name AXE by Ericsson and comprises a cabinet housing banks of switch and processor circuits. The processor circuits operate according to software processing modules, which in this specification are referred to as local modules as they are connected directly to the switches, being located in the same cabinet. The switch unit 2 is connected by a local area network cable 4 to a central router 3. The router 3 is connected to a bank of modems 5 for communication with remote computers including computers 6, 7 and 8.

In brief outline, the invention provides for control of the switches in the switch unit 2 operating not only under the control of local processors, but also remote processors in a scalable manner. This is achieved with little modification of local hardware or software. This provides a large degree of versatility by allowing easy expansion of processor resources irrespective of the geographical location. The manner in which this is achieved is described below.

Figure 2:
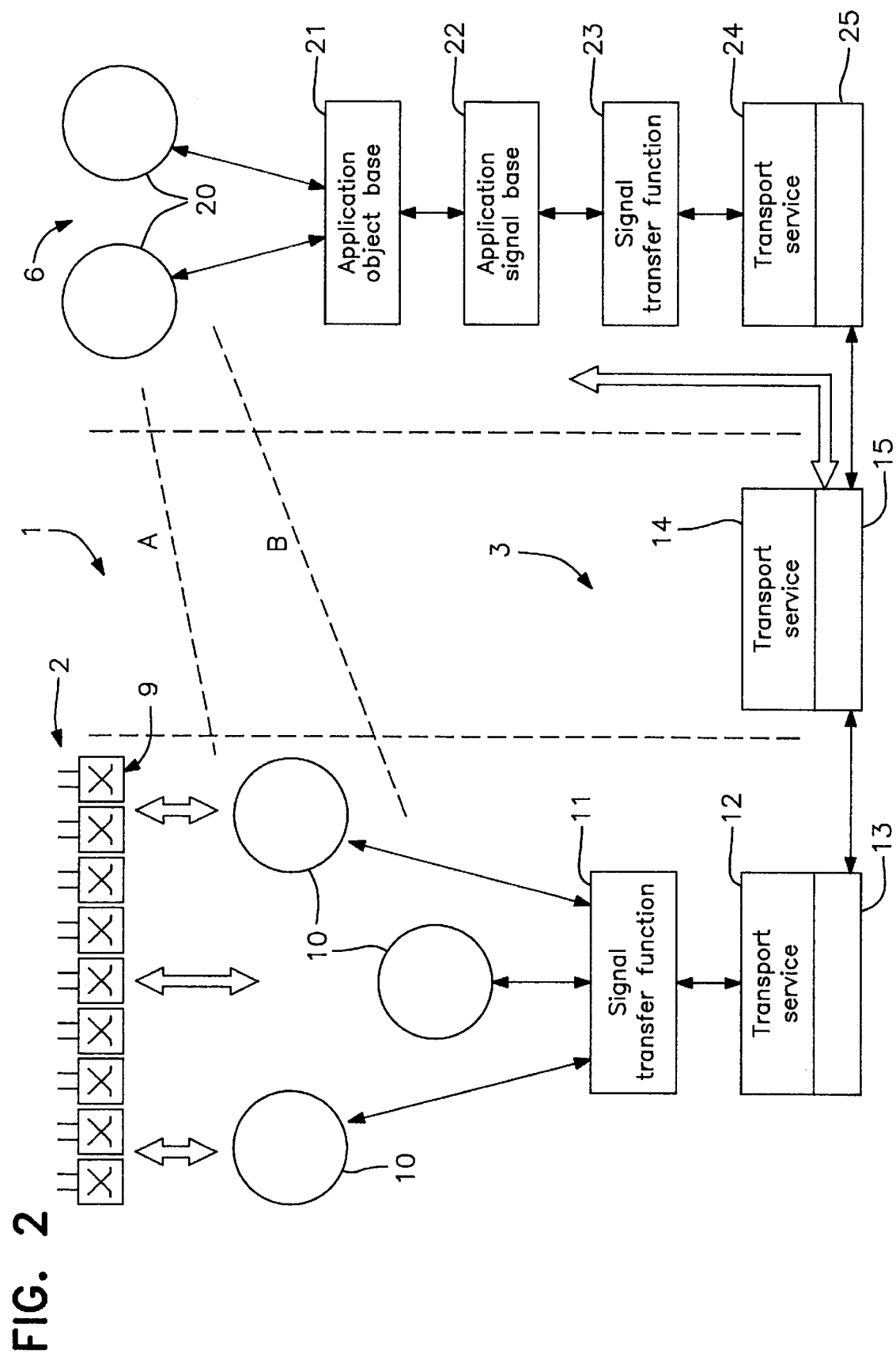
FIG. 2 is a more detailed representation of the system.

Referring now to FIG. 2, the telecommunications switching system 1 is shown in more detail. In the switching unit 2, there are switches 9 of conventional construction. These switches include group and concentrator switch circuits of the type supplied with an Ericsson AXE system.

The switches 9 are controlled by local processor modules 10, which are blocks of software code programmed according to their functions. The switch unit 2 also comprises a signal transfer function 11, which is a software module addressable in the same manner as one of the modules 10. The internal addressing protocol used is a dynamic linking method in which modules register with the operating system and there is asynchronous communication via the operating system.

The signal transfer function 11 is connected to a transport service 12, in turn connected to a physical communications link 13. The protocol stack is based on TCP/IP and provides services to connect/disconnect, send a data buffer, receive a data buffer, listen to a connection and provide abnormal termination services. In more detail, the following commands are handled by the transport service:

CONNECT: this connects one machine to a remote machine.

ENQUIRY: this allows a remote machine to query the state of its connection.

SERVER INFORMATION: this allows a host to provide information to a connected machine. An example is downloading of information from the central router.

SEND SIGNAL: this allows for straight-through transfer of a signal between the external interface and the internal circuits of the machine running the transport service.

RESPOND SIGNAL: this also provides for straight-through transfer of a signal, in the opposite direction to the SEND SIGNAL, and THREAD CONTROL: this controls execution of a switch thread in a machine.

LOG WRITE: this allows a remote machine to access a switch log. This is important for fault recovery.

SWITCH INFORMATION: this allows downloading of switch status information.

BUFFER COMMAND: this allows streaming of blocks of data from the switch unit to the router and on to a remote machine.

DISCONNECT: this allows disconnection and holding of a remote machine to a switch. This allows a long-running background process.

ECHO: this allows a remote machine to switch unit echo action.

The signal transfer function 11 handles the signals in a non-intelligent manner, providing an interface between the transport service 12 and the local modules 10. This is provided in a dedicated, hard-coded manner which may not be modified at the applications level. Indeed, the signal transfer function and the transport service 12 operate like an operating system service for transmission and receipt of signals. Together, they define signalling parameters for the machine which are non-editable. These parameters are used for operation of the commands listed above and include setting priorities, setting delay periods, and setting enumerated variable default settings. However, another important aspect of the signal transfer function 11 is the fact that it is programmed with the same internal addressing and communication facilities as the local modules 10. Thus, addition of the signal transfer function 11 is non-intrusive.

The router 3 operates a transport service 14 as a static process, while the remote machines 6, 7 and 8 run dynamic processes which dynamically establish links. Thus, the router 3 acts as a central hub, allowing dynamic connection of both the remote computers 6, 7 and 8 and also the switch unit 2. The transport service 14 is much like the transport service 12. However, the straight-through transfer commands are used for routing signals between external ports, and not into internal circuits. Thus, the transport service 14 passes the signals between the switch unit 2 and the various remote machines 6, 7 and 8. A physical port structure 15 is used.

Still referring to FIG. 2, a remote machine 6 is now described in more detail. The machine 6 comprises a number of processing applications or remote modules 20. These modules are programmed to perform various actions in conjunction with the local modules 10. These include capture of switching data, setting of subscriber parameters and other control functions. The modules 20 are connected to an application object base 21. The object base 21 comprises objects which each correspond to a function of a local module 10 and comprise a means for generating instructions corresponding to high-level instructions received from the remote modules 20. These instructions are passed to an application signal base 22 which interfaces between the remote modules 20 and a remote signal transfer function 23 by providing signal-level commands. For example, there may be different instruction protocols and the signal base 22 automatically provides the correct signal-level commands which are compatible with the local modules 10 to allow for universal transfer of instructions through the remote signal transfer function 23. The remote signal transfer function routes signals through a remote transport service.

The components 21 to 24 act together as a dynamic process to asynchronously establish a link with the central router 3, which runs its transport service 14 as a static process. Once a link is established, signal communication is effected in such a manner that the local modules 10 are not aware of the source of the incoming control signals and simply operate exactly as if there were no remote control. Therefore, the remote modules 20 can operate as if they were local modules. The manner in which this is achieved is explained in more detail below.

The object base 21 comprises objects at different levels of granularity associated with functions of the local modules 10. It includes both low and high level task-oriented objects which provide actions for access to specific switch functions such as connection or disconnection of subscribers. These objects provide an essential link between instructions from the remote modules and the local modules—allowing the remote modules 20 to be non-compatible.

Regarding the object-oriented nature of the object base 21, for each object class that is invisible in the switch unit 2, an equivalent C++ object class is implemented in the object base 22. The C++ class implements the logic necessary to make the attributes and actions accessible to the local modules 10. For example, there may be an object class for routing, the attributes being a route identifier, a route name, and a state. Actions implemented by a local module 10 would include blocking of the route and unblocking of the route. The object base 21 provides a method interface which translates the high-level commands from the remote modules 20 to a form compatible with the relevant local module 10. An important aspect of this operation is the fact that there is an object in the object base 21 directly associated with the module 10 or function within the module 10. The objects in the base 21 are provided in a library which can be easily accessed.

Figure 3:
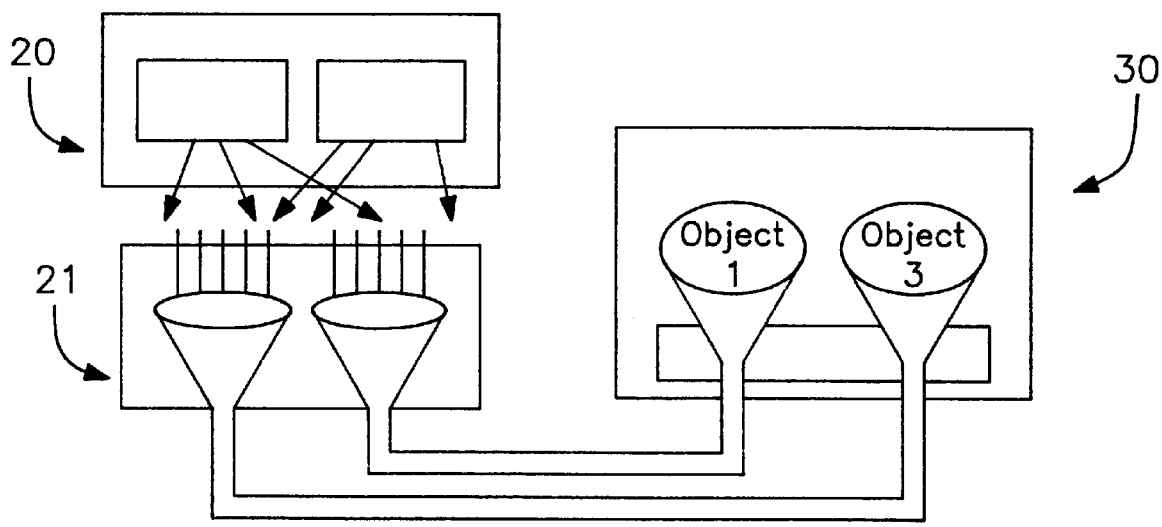
FIGS. 3 and 4 are diagrams illustrating examples of switching control

Referring to FIG. 3, the relationship between the object base 21 and the local modules 10 is illustrated. This indicates the feature whereby different remote modules may "filter" their instructions through the relevant object which is associated with the function of the relevant local module 10 which performs the necessary function.

The signal base 21 provides the actual compatible signals for the local modules 10. An example is the READ STATE signal which is transmitted to allow a remote module 20 to read the state of a particular switch 9. The signal base 22 transmits to the signal transfer function 23 the actual code. Examples are:

D1=AJ—specifies the addressee
D2=16—specifies signal code
D3—specifies the switch state as follows
D3=0—switch blocked,
D3=1—line blocked,
D3=2—switch sealed,
D3=3—switch being tested,
D3=4—line locked out,
D3=5—switch idle,
D3=6—switch busy,
D3=7—switch occupied for incoming traffic only,
D3=8—switch semi-permanently connected (such as to a computer).

Figure 4:
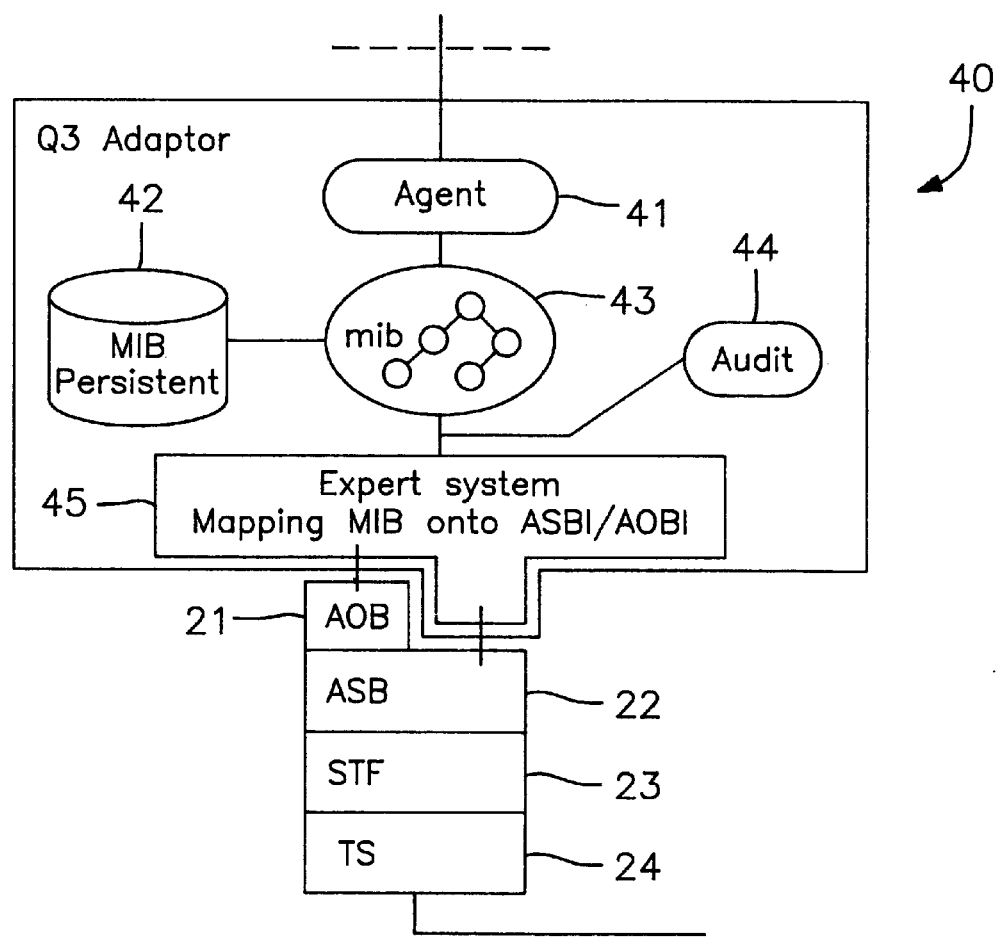

Referring now to FIG. 4, one example for use of the architecture of the invention is illustrated. Like parts are assigned the same reference numerals. In this example a Q3 adaptor expert system is built on top of the architecture. The expert system 40 comprises an agent 41, an MIB persistent database 42, processing modules 43, an audit module 44, and mapping functions 45. The expert system 40 is essentially a single remote module 20. The fact that it is not compatible with the local modules 10 in programming language or communication protocols does not present a problem because of operation of the system as described above.

It will thus be appreciated that the invention can be applied to a wide variety of functions. In the example of FIG. 4, an interface is provided to allow interworking of the switch unit 1 with other switch units or controllers via the central router and remote machines. However, remote modules 20 may have different functions such as capturing of data for subsequent off-line processing or real time processing.

The invention is not limited to the embodiments hereinbefore described, and may be varied within the scope of the claims in construction and detail.

We claim:

1. The telecommunications switching system comprising a plurality of switches connected to a processor means characterised in that, the processor means comprises a plurality of local modules connected to a local transport service, and a plurality of remote modules connected to a remote transport service;

the system further comprises a central router comprising a transport service comprising means for communication with the local and remote transport services;

the system further comprises a local signal transfer function which is addressable by the local modules as another such module, and comprises means for transferring signals from the local modules to the remote modules via the transport services; and the local modules comprise means for controlling the switches according to commands received from the remote modules and for downloading switch status data to the remote modules.

2. The telecommunications switching system as claimed in claim 1, wherein the local signal transfer function comprises means for operating in a dedicated signal transfer mode according to pre-defined transfer parameter values without reference to data or commands in transferred signals.

3. The telecommunications switching system as claimed in claim 2, wherein said parameter values include values for signal priorities and delays, and verification values.

4. The telecommunications switching system as claimed in claim 1, wherein the central router transport service comprises means for operating as a static process, and the modules comprise means for operating as dynamic processes which dynamically link up with said static process.

5. The telecommunications switching system as claimed in claim 1, wherein the system further comprises a remote signal transfer function comprising means for transferring signals between the remote modules and the remote transport service and for operating according to parameter values which are compatible with those of the local signal transfer function.

6. The telecommunications switching system as claimed in claim 5, wherein the system further comprises a signal base comprising means for interfacing between the remote modules and the remote signal transfer function by providing signal-level commands for module-level instructions.

7. The telecommunications switching system as claimed in claim 6, wherein said signal base comprises means for providing signal-level commands for different module-level instructing protocols for universal transfer through the remote signal transfer function.

8. The telecommunications switching system as claimed in claim 6, wherein the system further comprises an object base comprising software objects each corresponding to a function of a local module and comprising means for generating instructions for the signal base corresponding to higher-level module instructions.

9. The telecommunications switching system as claimed in claim 6, wherein the system further comprises an object base comprising software objects each corresponding to a function of a local module and comprising means for generating instructions for the signal base corresponding to higher-level module instructions and the object base comprises objects corresponding to creation of a route, blocking a route, and unblocking a route.

* * * * *